United States Patent

[11] 3,583,429

| [72] | Inventor | Walter E. Desmarchais<br>Monroeville, Pa. |
|------|----------|---|
| [21] | Appl. No. | 657,125 |
| [22] | Filed | July 31, 1967 |
| [45] | Patented | June 8, 1971 |
| [73] | Assignee | Westinghouse Electric Corporation<br>Pittsburgh, Pa. |

[54] REACTOR VESSEL SUPPORTS
6 Claims, 5 Drawing Figs.

[52] U.S. Cl. ........................................... 137/376, 176/87
[51] Int. Cl. ........................................... G21c 13/04
[50] Field of Search .......................................... 137/571, 573, 376; 176/52, 50, 87

[56] References Cited
UNITED STATES PATENTS

| 1,117,133 | 10/1914 | Juilfs | 137/376 |
| 1,734,571 | 11/1929 | Godfrey | 137/376 |
| 1,969,432 | 8/1934 | Smith et al. | 137/376 |
| 2,534,267 | 12/1950 | Kahn | 137/376 |
| 3,026,256 | 3/1962 | Lilveblad et al. | 176/52X |
| 3,034,976 | 5/1962 | Fortescue et al. | 176/52X |
| 3,123,328 | 3/1964 | Trickett et al. | 176/87X |

*Primary Examiner*—William R. Cline
*Attorneys*—A. T. Stratton and Z. L. Dermer

ABSTRACT: A reactor vessel support is disclosed wherein the main coolant flow nozzles serve as vessel supports in addition to performing their primary function as conduits. The support nozzles are supplied with integral pads on their undersides which in cooperation with their normally large cross-sectional areas adequately sustain the static, dynamic, and thermal loadings, and thus render additional load bearing members unnecessary.

PATENTED JUN 8 1971　　　　　　　　　　　　　　　　3,583,429

INVENTOR
Walter E. Desmarchais
BY
ATTORNEY

3,583,429

REACTOR VESSEL SUPPORTS

BACKGROUND OF THE INVENTION

This invention relates to nuclear reactor vessel supports and more particularly to the utilization of primary structural elements to perform the support function.

Nuclear reactor vessels of the prior art were supported by skirts, or a series of brackets symmetrically disposed circumferentially around the outside of the vessel wall.

Skirt construction permits radial growth of the pressure vessel due to pressure and temperature. The length of the skirt is chosen so as to permit bending in the manner of a beam on an elastic foundation to take place safely. The skirt is attached to one of the highest stress areas in the vessel, i.e. to the underside of the vessel flange and downward through the nozzle region. Moreover, the thermal stress problem introduced by the temperature gradient of the skirt from its contact point with the vessel to that of its cold support base necessitates a complicated and costly design.

Bracket supports on the hand provide for radial growth of the vessel by sliding. It is highly desirable to keep the vessel support brackets out of the core region where tee neutron flux is highest. This means that the brackets must be attached to the exterior vessel wall closely adjacent the inlet and outlet nozzles. Today's reactors are of such a size that extremely massive brackets are required to adequately support the static and dynamic loads imposed upon them. Seismic loadings may also be imposed on the support brackets depending upon the graphical location of the plant. In many instances, the maximum combined stresses introduced in the vessel is at the point of attachment of these brackets to the vessel wall. These massive brackets which add considerable metal to the reactor are costly due to fabrication and welding attachment to the vessel shell.

SUMMARY OF THE INVENTION

This invention solves the problems of the prior art by utilizing primary structural elements for support, i.e., the flow nozzles. This multiple-function approach eliminates the addition of support skirts or brackets to the pressure vessel.

The reactor is constructed such that the coolant inlet nozzles and coolant outlet nozzles extend radially outward from the vessel, lie in the same horizontal plane, and are generally above the high flux core region. This is accomplished by supportedly suspending a core-barrel within the pressure vessel. Flow entering through the inlet nozzles proceeds to a bottom manifold through an access annulus formed by the substantially cylindrical walls of the pressure vessel and the core-barrel. The coolant then flow upwardly through the core region where its temperature is appreciably increased to an upper manifold. The outlet nozzles extend through the pressure vessel to the core-barrel and engage a nozzle extending from the core-barrel at the level of the upper manifold. The flow proceeds from the upper manifold through the outlet nozzles to heat exchange and energy conversion structure.

Because of the high static and dynamic loads, and in particular because of the neutron flux and thermal gradients, the design of a vessel support is no simple undertaking. The support structure is, as a rule, affixed to the reactor above the high flux region adjacent the core. On the other hand, the fluid at this level is at its highest temperature and extreme thermal gradients are difficult to avoid. Moreover, this region is in most reactors crowded with other structural elements such as flow nozzles and flanges for the support of the reactor internals and as such is one of the highest stress areas of the vessel.

Since the flow nozzles are above the core region, the high flux region is avoided. Further, the flow through the nozzles reduces the thermal gradient and thus decreases the magnitude of this major problem. In accordance with this invention, flow nozzles which are inherently of a large cross section to minimize the risk of leakage of radioactive fluids, are designed to adequately support the imposed loading. Thus the support means of the invention is uniquely applicable to the solution of the support problem and results in an appreciable reduction in cost.

DESCRIPTION OF THE DRAWINGS

For a better understanding of the invention, reference may be had to the accompanying drawings, in which.

DESCRIPTION OF THE PREFERRED EMBODIMENT

Figure 1:
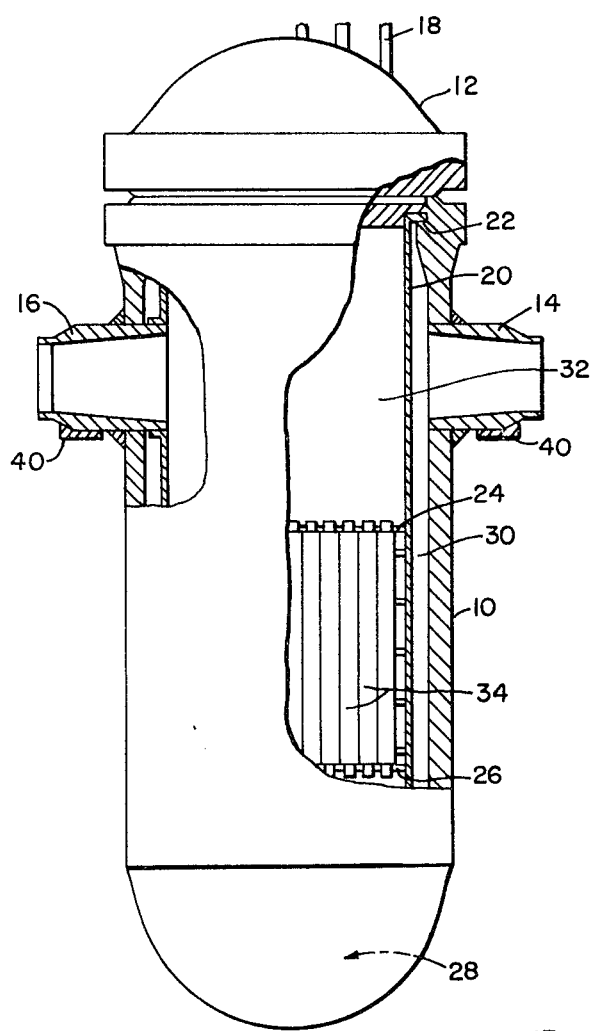
FIG. 1 is a side view of a reactor pressure vessel adapted to this invention and showing portions thereof in section to depict schematically the reactor core.
Figure 5:
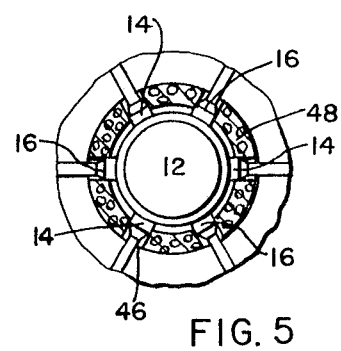
FIG. 5 is a cross-sectional view taken along the line V-V of FIG. 4.

Referring to FIG. 1, there is illustrated a nuclear reactor incorporating the flow nozzle vessel support means of this invention. A pressure vessel 10 is shown which forms a tight pressurized container when enclosed with a head assembly 12 by suitable seal welds and head bolts (not shown). The pressure vessel 10 has a number of coolant flow inlet means 14 and coolant flow outlet means 16 projecting from a peripheral wall thereof. FIG. 5 shows the manner in which the coolant flow inlet means 14 and the coolant flow outlet means 16 are alternated circumferentially about the exterior wall of the pressure vessel 10. The head assembly 12 may be noted to have a plurality of head penetration adapters 18 located in and extending through its substantially hemispherical wall in parallel alignment with the axis of the pressure vessel 10. A core barrel 20 is supportedly suspended from an inwardly extending projection 22 just below the top of the pressure vessel 10. An upper core plate 24 and a lower core plate 26 are located and define the axial extremities of the reactor core in the core barrel 20.

Coolant flow entering through inlets 14 proceeds to a bottom coolant manifold 28 through a flow annulus 30 formed by the lower walls of the pressure vessel 10 and the core barrel 20. From the bottom coolant manifold 28 the flow proceeds generally axially upward through the nuclear core region located between the core plates 24 and 26 to an upper manifold region 32 from which it then proceed through the outlet nozzles 16 and through conduits 17 welded to the nozzles 16 to energy conversion structure (not shown). It should be noted that tee coolant flow outlets 16 are extended through the pressure vessel wall 10 to openings in the core barrel to facilitate egress of the coolant flow from the upper manifold 32.

The region between the upper core plate 24 and the lower core plate 26 is generally filled with a plurality of fuel assemblies 34 all of which are substantially identical. The parallel array of fuel assemblies 34 includes a plurality of fuel rods (not shown).

The nuclear reactor illustrative of this invention thus has a plurality of coolant flow nozzles 14 and 16 uniquely situated and in accordance with this invention sized to have a sufficiently large cross-sectional area to perform the additional function of supporting the reactor vessel. For this purpose the nozzles 14 and 16 are supplied with built-up pads 40 secured to the nozzles and on the undersides thereof. The pads 40 may comprise layers of weldment built up on the underside of the nozzle and machined to form a composite structure of the desired shape.

Figure 4:
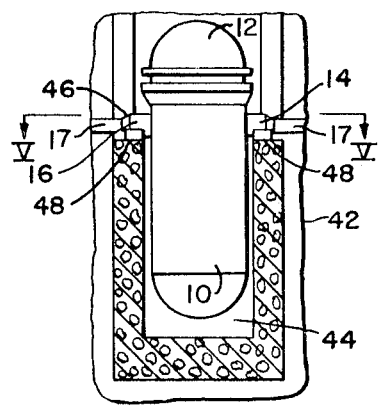
FIG. 4 shows the reactor vessel supportedly suspended in a containment well according to this invention.
Figure 2:
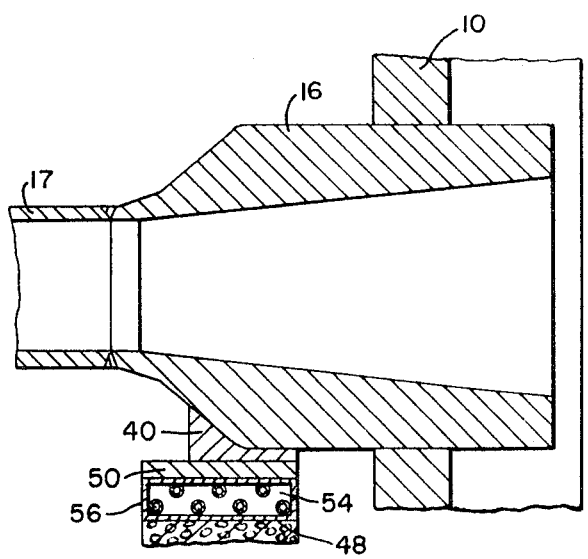
FIG. 2 is an enlarged sectional view of the support-flow nozzle of the reactor vessel of FIG. 1.
Figure 3:
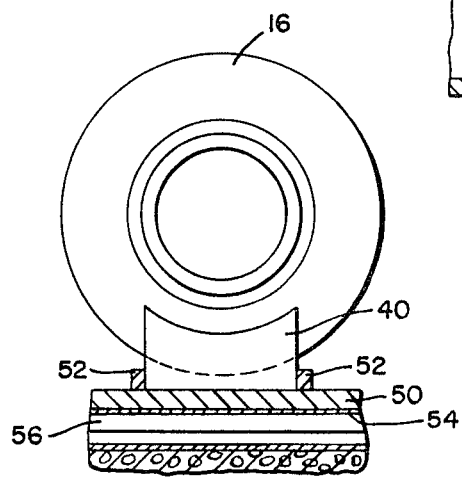
FIG. 3 shows and end view of the nozzle structure of FIG. 2.

Referring now to FIG. 4 a vessel containment and support structure generally designated by the numeral 42 is shown having a well 44 therein. A number of openings 46, best seen in FIG. 5, are left in the wall of the well 44 so as to form access channels for the inlet and outlet nozzles 14 and 16. The bottom walls or surfaces of the openings 46 designated by the numeral 48 are generally horizontal and of sufficient strength to support the vessel.

The pads 40 bear upon and are supported by ware plates 50. Side shims 52 may be welded or bolted to the ware plates 50 to form guide channels for sliding movement of the pads 40 upon radial growth of the pressure vessel 10. Between the ware plates 50 and the walls 48 of the openings 46 refrigerated supporting structures 54 including refrigerant tubes 56 are utilized to assure that the concrete walls 48 are not subjected to the high temperatures which the ware plates 50 acquire due to flow through the nozzles 14 and 16.

As can be seen in this illustrative embodiment, the vessel is supported by six flow nozzles and thus needs neither brackets nor skirts to hold it safely. The number of nozzles which will be available to support the vessel depends upon the number of loops of a particular nuclear facility, i.e., the number of closed paths including an outlet means, power conversion means, an inlet means, and the reactor itself. Generally two, three, or four loop plants are utilized. Therefore, four, six (as in this illustrative embodiment), or eight nozzles will be present from which a reactor vessel may be supportedly suspended. It will, therefore, be apparent that there has been disclosed a novel vessel support which renders unnecessary the use of expensive skirts and/or brackets.

I claim:

1. In combination, a support structure having a well therein, a pressure vessel having a material capable of generating substantial heat therein whereby said vessel is subject to radial expansion, said vessel being substantially disposed within said well, coolant inlet nozzles and coolant outlet nozzles projecting outwardly and spaced about the peripheral wall of said pressure vessel, at least some of said nozzles bearing on surfaces of said well so as to support said pressure vessel.

2. The combination of claim 1 wherein said nozzles have integral pads and said well has a number of horizontal surfaces, said pads slidably bearing upon said horizontal surfaces whereby expansion of said pressure vessel is facilitated.

3. The combination of claim 2 wherein a ware plate having side shims supportedly receives said pads and cooling means are interposed between said pads and said horizontal surfaces.

4. The combination of claim 1 wherein conduits are affixed to said inlet and outlet nozzles, said conduits extending to the exterior of said well.

5. The combination of claim 1 wherein the well is constructed substantially of concrete and cooling means are interposed between the nozzles and the well.

6. In combination, a support structure having a well therein, a pressure vessel having a nuclear core therein and having a core-barrel contained therein; said core-barrel and said vessel forming a chamber therebetween, at least one inlet nozzle opening into said chamber, at least one outlet nozzle extending through said pressure vessel and to the interior of said core-barrel, said inlet nozzle and said outlet nozzle extending radially outward from said pressure vessel in the same horizontal plane, said inlet nozzle and said outlet nozzle bearing on a surface of said well so as to support said pressure vessel.